(12) United States Patent
Akita et al.

(10) Patent No.: US 9,677,485 B2
(45) Date of Patent: Jun. 13, 2017

(54) EXHAUST GAS RECIRCULATION APPARATUS FOR ENGINE

(71) Applicant: AISAN KOGYO KABUSHIKI KAISHA, Obu-shi, Aichi (JP)

(72) Inventors: Minoru Akita, Ama (JP); Mamoru Yoshioka, Nagoya (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 527 days.

(21) Appl. No.: 14/230,898

(22) Filed: Mar. 31, 2014

(65) Prior Publication Data
US 2014/0290239 A1    Oct. 2, 2014

(30) Foreign Application Priority Data

Apr. 2, 2013 (JP) ................................ 2013-076661

(51) Int. Cl.
*F02D 41/00* (2006.01)
*F02M 26/05* (2016.01)
(Continued)

(52) U.S. Cl.
CPC ......... *F02D 41/0077* (2013.01); *F02M 26/05* (2016.02); *F02M 26/54* (2016.02);
(Continued)

(58) Field of Classification Search
CPC ........... F02D 41/0077; F02D 2011/104; F02D 2041/2024; F02D 2011/102; F02M 26/54;
(Continued)

(56) References Cited

U.S. PATENT DOCUMENTS 2,912,644 A * 11/1959 Makous ............... G01R 31/343
                                                              324/546
4,442,392 A * 4/1984 Hore .......................... H02P 8/30
                                                              310/77
(Continued)

FOREIGN PATENT DOCUMENTS

JP              63283492 A  * 11/1988
JP          2001-263096 A    9/2001
(Continued)

*Primary Examiner* — Sizo Vilakazi
*Assistant Examiner* — Brian Kirby
(74) *Attorney, Agent, or Firm* — Oliff PLC (57) ABSTRACT

An EGR apparatus includes an EGR passage to allow part of exhaust gas discharged from a combustion chamber to flow in an intake passage and recirculate back to the combustion chamber and an EGR valve to regulate EGR gas in the EGR passage. The EGR valve includes a valve seat, a valve element, and a step motor. An ECU calculates a target correction value corresponding to an operating condition of an engine, cuts off energization to the step motor in order to hold the EGR valve at a predetermined opening degree during operation thereof, and then restarts energization to the step motor, calculates an energization cutoff correction value corresponding to an elapsed time from energization cutoff, and corrects the target correction value by the calculated energization cutoff correction value in order to control the EGR valve to the target opening degree.

6 Claims, 8 Drawing Sheets

(51) Int. Cl.
*F02M 26/54* (2016.01)
*F02D 11/10* (2006.01)
*F02D 41/20* (2006.01)

(52) U.S. Cl.
CPC  *F02D 2011/104* (2013.01); *F02D 2041/2024* (2013.01); *Y02T 10/47* (2013.01)

(58) Field of Classification Search
CPC . F02M 26/05; Y02T 10/47; H02P 8/30; H02P 8/24; H02P 8/28; F01L 9/0419
USPC ............ 123/568.18, 568.19, 568.21, 568.23, 123/568.24, 568.26, 339.25, 339.26; 60/605.2
See application file for complete search history.

(56) References Cited

U.S. PATENT DOCUMENTS

| | | | | |
|---|---|---|---|---|
| 4,890,027 A * | 12/1989 | Bohner | ................ | F16D 63/00 310/328 |
| 4,897,584 A * | 1/1990 | Grutzmacher | ........... | G01K 7/20 318/471 |
| 5,029,660 A * | 7/1991 | Raad | ................ | B62D 6/00 180/422 |
| 5,152,266 A * | 10/1992 | Sekiguchi | ........... | F02D 35/0007 123/357 |
| 5,201,291 A * | 4/1993 | Katoh | ................ | F02D 11/107 123/399 |
| 5,520,150 A * | 5/1996 | Kimoto | ................ | F02D 11/10 123/339.26 |
| 5,539,601 A * | 7/1996 | Farag | ................ | H02H 6/005 361/23 |
| 5,684,349 A * | 11/1997 | Hara | ................ | H02K 7/102 310/36 |
| 5,704,340 A * | 1/1998 | Togai | ................ | F02D 41/0072 123/568.28 |
| 5,722,632 A * | 3/1998 | Rader | ................ | F02M 26/57 123/568.27 |
| 5,921,224 A * | 7/1999 | Sinnamon | ........... | F02D 41/0077 123/568.21 |
| 5,931,142 A * | 8/1999 | Gerling | ................ | F16K 31/04 123/568.23 |
| 6,729,314 B2 * | 5/2004 | Radhamohan | ......... | F02M 26/48 123/568.21 |
| 6,755,078 B2 * | 6/2004 | Hernandez | ......... | F02D 41/1447 73/114.31 |
| 6,974,119 B2 * | 12/2005 | Brendle | ................ | F02D 11/10 123/399 |
| 7,177,754 B2 * | 2/2007 | Kaneko | ................ | F02D 41/0052 123/568.22 |
| 7,243,019 B2 * | 7/2007 | McLain | ................ | F02D 41/0077 123/568.21 |
| 7,913,972 B2 * | 3/2011 | Parsons | ................ | F16K 31/05 251/111 |
| 8,196,404 B2 * | 6/2012 | Onishi | ................ | F02D 41/0065 123/198 DB |
| 8,505,872 B2 * | 8/2013 | Kawamura | ......... | F16K 31/04 123/568.19 |
| 2004/0124801 A1 * | 7/2004 | Jurado | ................ | G05B 13/0265 318/476 |
| 2004/0134192 A1 * | 7/2004 | Umehara | ............. | F02D 41/005 60/605.2 |
| 2005/0001185 A1 * | 1/2005 | Everingham | ......... | F02M 26/54 251/69 |
| 2007/0182355 A1 * | 8/2007 | Ueda | ................ | H02P 6/34 318/599 |
| 2008/0011269 A1 * | 1/2008 | Tanimura | ............. | F02D 41/107 123/337 |
| 2008/0083394 A1 * | 4/2008 | Akita | ................ | F02D 9/1065 123/399 |
| 2009/0229584 A1 * | 9/2009 | Asanuma | ............. | F02M 25/06 123/573 |
| 2009/0241872 A1 * | 10/2009 | Wang | ................ | F01L 9/04 123/90.11 |
| 2010/0060217 A1 * | 3/2010 | Ikeda | ................ | H02P 6/20 318/400.11 |
| 2010/0174471 A1 * | 7/2010 | Nakayama | ............. | F02M 26/49 701/108 |
| 2011/0273127 A1 * | 11/2011 | Imamura | ............. | F02D 41/1497 318/650 |
| 2011/0290218 A1 * | 12/2011 | Yoshioka | ............. | F02D 13/02 123/48 R |
| 2013/0047941 A1 * | 2/2013 | Niwa | ................ | F02D 9/1065 123/90.11 |
| 2013/0048442 A1 * | 2/2013 | Burnett | ................ | H02K 7/102 188/72.1 |
| 2013/0206118 A1 * | 8/2013 | Yoshikawa | ......... | F02D 41/0055 123/568.11 |
| 2013/0312718 A1 * | 11/2013 | Yoshioka | ............. | F02M 25/0771 123/568.21 |
| 2015/0068504 A1 * | 3/2015 | Hatano | ................ | F02D 41/0077 123/568.26 |

FOREIGN PATENT DOCUMENTS

| | | |
|---|---|---|
| JP | 2007-309115 A | 11/2007 |
| JP | 2010-53776 A | 3/2010 |
| JP | 2011-252482 A | 12/2011 |
| JP | 2012-7505 A | 1/2012 |

* cited by examiner

EXHAUST GAS RECIRCULATION APPARATUS FOR ENGINE

CROSS-REFERENCE TO RELATED APPLICATIONS

This application is based upon and claims the benefit of priority from each of the prior Japanese Patent Application No. 2013-076661 filed on Apr. 2, 2013, the entire contents of which are incorporated herein by reference.

BACKGROUND OF THE INVENTION

Field of the Invention

The present invention relates to an exhaust gas recirculation apparatus for an engine to allow part of exhaust gas discharged from an engine to an exhaust passage to flow in an intake passage to recirculate back to the engine.

Related Art

Conventionally, a technique of the above type is employed in a vehicle engine, for example. An exhaust gas recirculation (EGR) apparatus is arranged to introduce part of exhaust gas after combustion, which is discharged from a combustion chamber of an engine to an exhaust passage, into an intake passage as EGR gas through an EGR passage so that the exhaust gas is mixed with intake air flowing in the intake passage and flows back to the combustion chamber. The EGR gas flowing in the EGR passage is regulated by an EGR valve provided in the EGR passage. This EGR can reduce mainly nitrogen oxide (NOx) in the exhaust gas and improve fuel consumption during a partial load operation of the engine.

Exhaust gas from the engine contains no oxygen or is in an oxygen lean state. Thus, when part of the exhaust gas is mixed with the intake air by EGR, the oxygen concentration of the intake air decreases. In a combustion chamber, therefore, fuel burns in a low oxygen concentration. Thus, a peak temperature during combustion decreases, thereby restraining the occurrence of NOx. In a gasoline engine, even when the content of oxygen in intake air is not increased by EGR and a throttle valve is closed to some degree, it is possible to reduce pumping loss of the engine.

Herein, recently, it is conceivable to perform EGR in the entire operating region of the engine in order to further improve fuel consumption. Realization of high EGR is thus demanded. To realize the high EGR, it is necessary for conventional arts to increase the internal diameter of an EGR passage or increase the opening area of a flow passage provided by a valve element and a valve seat of an EGR valve.

JP-A-2012-7505 discloses an EGR apparatus to be provided in a supercharger-equipped engine. This supercharger includes a compressor provided in an intake passage and a turbine provided in an exhaust passage and is configured to rotate the turbine by exhaust gas flowing in the exhaust passage, thereby integrally rotating the compressor, to increase the pressure of intake air in the intake passage. The EGR apparatus is a low-pressure loop type EGR apparatus in which an EGR passage is provided between an exhaust passage downstream of the turbine and an intake passage upstream of the compressor. An EGR valve provided in the EGR passage is configured to be controlled by an electronic control unit (ECU) according to an operating condition of an engine. This EGR apparatus is arranged to forcibly narrow the EGR valve down to a predetermined low opening degree once at the time of engine deceleration in order to prevent misfire of the engine during deceleration, and hold the narrowed state. This control is performed to temporarily increase pressure loss in the EGR passage during engine deceleration and also prevent a larger amount of EGR gas than assumed from flowing from the EGR passage into the intake passage.

Herein, one of the EGR valves for use in the EGR apparatus is already known as a motor-driven EGR valve arranged to open and close a valve element with respect to a valve seat by a step motor or a DC motor to control the valve element to a small opening degree. This kind of EGR valve is disclosed in for example JP-A-2007-309115.

SUMMARY OF INVENTION

Problem to be Solved by the Invention

Meanwhile, it is conceived that the motor-driven EGR valve is to be held at a predetermined low opening degree during engine deceleration or during idle operation as in the EGR apparatus disclosed in JP-A-2012-7505. Moreover, to reduce power consumption of the motor for the purpose of improving engine fuel consumption, it is conceivable to cut off or stop energization (power supply) to the motor when the EGR valve is to be held at the predetermined low opening degree.

However, if the energization to the motor in the EGR valve is cut off, the motor stops self-heating having occurred until then, thus resulting in a decrease in temperature of components placed adjacent to the motor in the EGR valve. Accordingly, the temperature decrease causes thermal contraction of those components. Under the influence of the thermal contraction, the valve element is displaced with respect to the valve seat, which may cause a deviation of an actual opening degree of the EGR valve from an intended target correction value. Such a deviation in opening degree also appears when the EGR valve held at the low opening degree is opened again in a direction to increase an opening degree by restarting of energization to the motor. This causes excess and deficiency in the flow rate of EGR gas allowed to recirculate to a combustion chamber and thus may lead to deterioration in exhaust emission and driveability of an engine.

Figure 8:
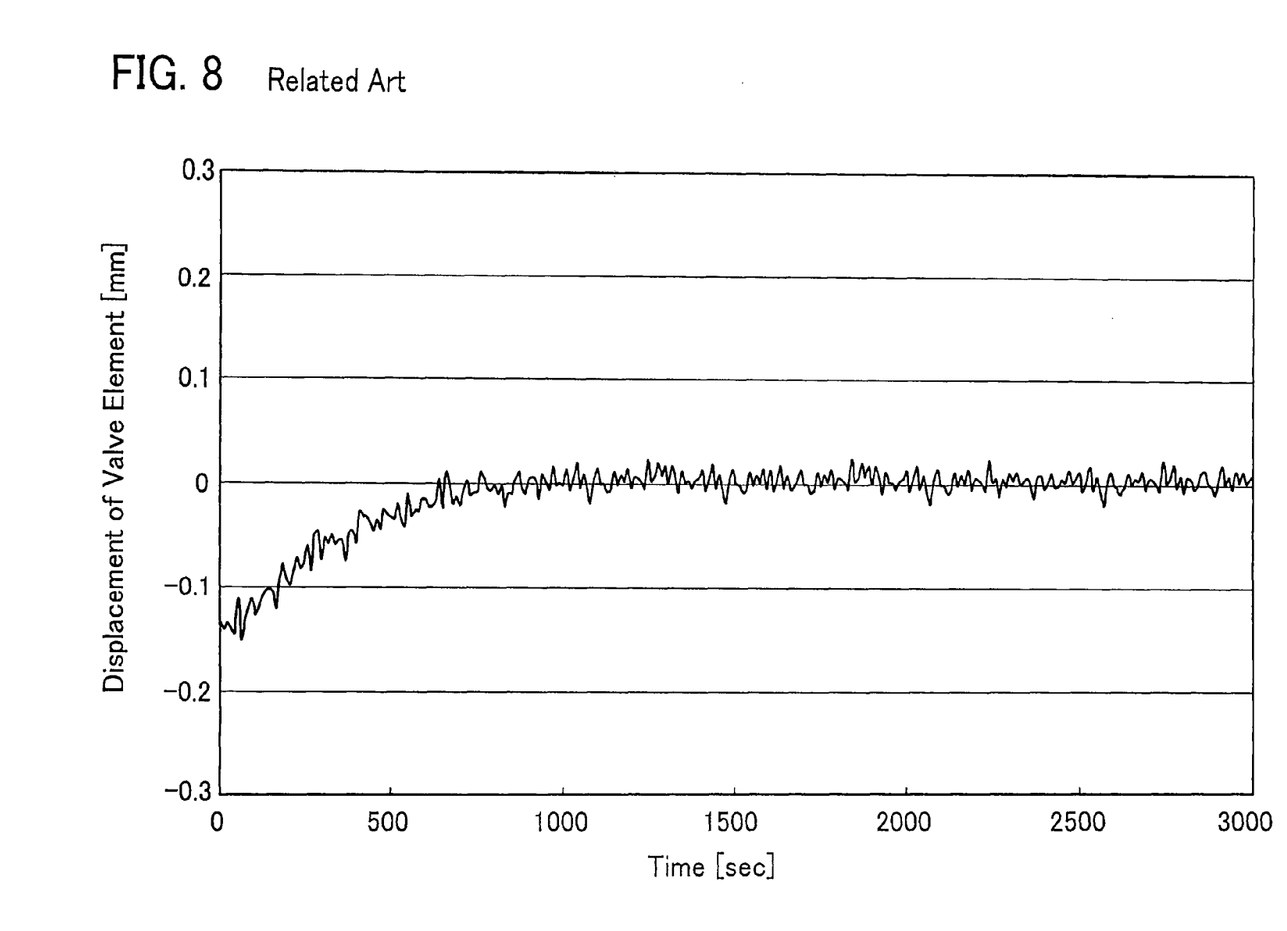
FIG. 8 is a time chart showing behaviors of displacement of a valve element of an EGR valve during operation after energization to a motor is cut off in a conventional example.

FIG. 8 is a time chart showing behaviors of displacement of a valve element of an EGR valve during operation after the time when energization to a motor is cut off. In FIG. 8, when the energization to the motor is cut off at time "0", the motor having been hitherto a heat source by energization is stopped. With time, accordingly, resin components of the EGR valve undergo thermal contraction due to temperature decrease. The valve element is thus displaced with respect to the valve seat. FIG. 8 reveals that the valve element held at a position about "−0.14 (mm)" for example is displaced to a position "0 (mm)" after a lapse of about 800 seconds (about 13 minutes). By this displacement of the valve element, an actual opening degree of the EGR valve is deviated from an intended target correction value, leading to an error in EGR gas flow rate.

The present invention has been made in view of the circumstances and has a purpose to provide an exhaust gas recirculation apparatus for engine, configured such that, even when a motor-driven exhaust gas recirculation valve is held at a predetermined opening degree by energization cutoff during operation of the valve and then energization is restarted to open the valve again in a direction to increase an opening degree, the exhaust gas recirculation valve can be controlled at an appropriate opening degree in response to a deviation of an actual opening degree caused by thermal contraction.

Means of Solving the Problem

To achieve the above purpose, one aspect of the invention provides an exhaust gas recirculation apparatus for an engine, the apparatus including: an exhaust gas recirculation passage to allow part of exhaust gas discharged from a combustion chamber of an engine to an exhaust passage to flow as exhaust recirculation gas into an intake passage and recirculate back to the combustion chamber; a motor-driven exhaust gas recirculation valve provided in the exhaust gas recirculation passage to regulate a flow rate of the exhaust recirculation gas in the exhaust gas recirculation passage, the exhaust gas recirculation valve including a valve seat, a valve element provided to be seatable on the valve seat, and a motor to drive the valve element; and a control unit configured to control the exhaust gas recirculation valve according to an operating condition of the engine, wherein the control unit is configured to: calculate a target correction value corresponding to the operating condition of the engine; cut off energization to the motor when the exhaust gas recirculation valve is to be held at a predetermined opening degree during operation of the exhaust gas recirculation valve; and then restart energization to the motor, calculate an energization cutoff correction value corresponding to an elapsed time since energization to the motor is cut off, and correct the target correction value by the calculated energization cutoff correction value when the exhaust gas recirculation valve is to be controlled to the target opening degree.

Effects of the Invention

According to the present invention, even when a motor-driven exhaust gas recirculation valve is held at a predetermined opening degree or position by energization cutoff during operation of the valve and then energization is restarted to open the valve again in a direction to increase an opening degree, it is possible to control the exhaust gas recirculation valve to an appropriate opening degree in response to a deviation of an actual opening degree caused by thermal contraction, thus appropriately control a flow rate of exhaust recirculation gas to be recirculated to a combustion chamber, thereby enabling preventing degradation in exhaust emission and driveability of an engine.

DESCRIPTION OF EMBODIMENTS

A detailed description of a preferred embodiment of an exhaust gas recirculation apparatus for an engine embodying the present invention will now be given referring to the accompanying drawings.

Figure 1:
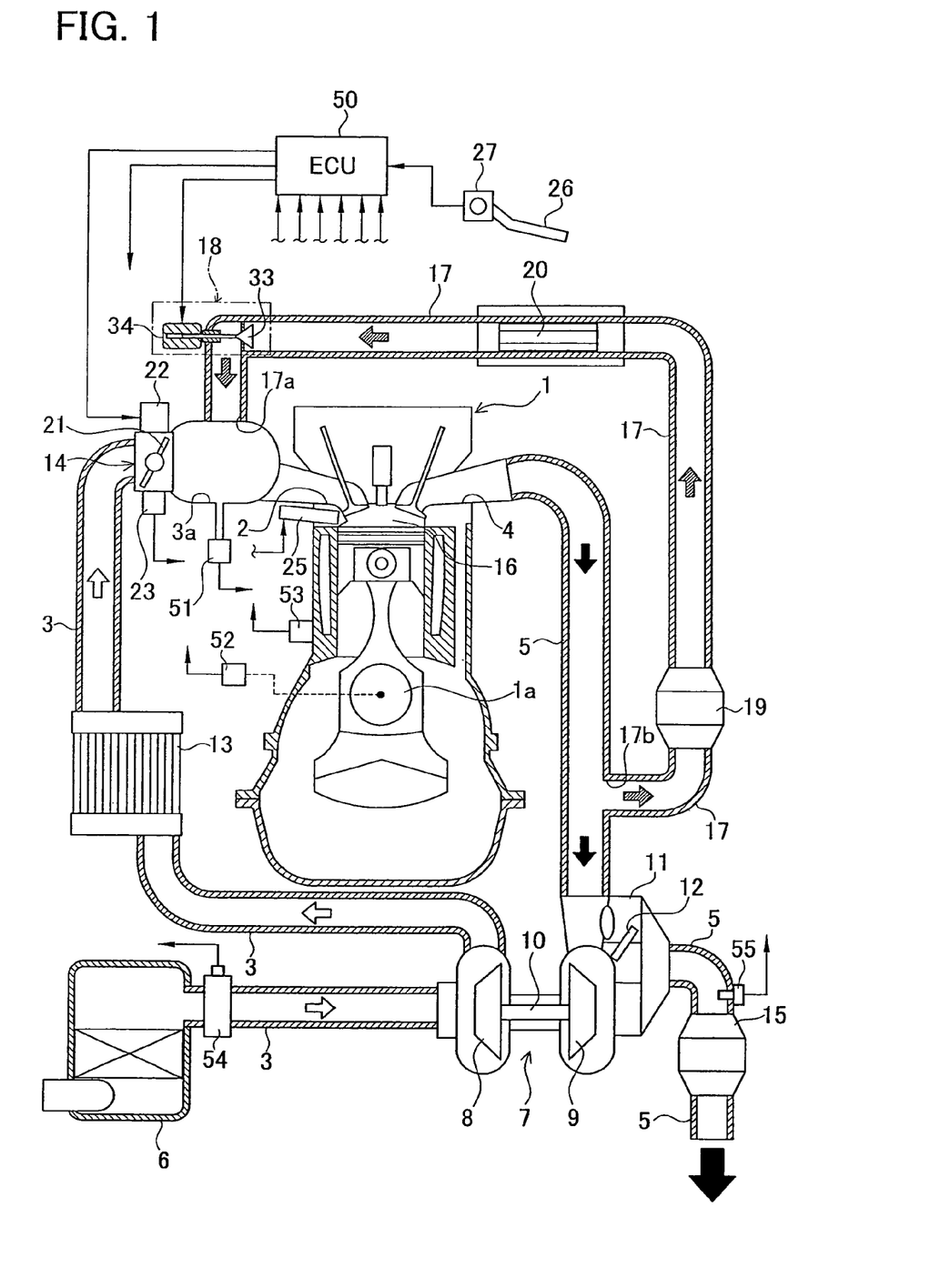
FIG. 1 is a schematic configuration view showing a supercharger-equipped engine system including an exhaust gas recirculation (EGR) apparatus for an engine in an embodiment.

FIG. 1 is a schematic configuration view showing a supercharger-equipped engine system including an exhaust gas recirculation (EGR) apparatus for an engine in the present embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream from the air cleaner 6, a supercharger 7 is placed in a position between a portion of the intake passage 3 and a portion of the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure increased by the compressor 8 and hence a high temperature, down to an appropriate temperature. A surge tank 3a is provided in the intake passage 3 between the intercooler 13 and the engine 1. Further, an electronic throttle device 14 that is an electrically-operated throttle valve is placed downstream from the intercooler 13 but upstream from the surge tank 3a. This throttle device 14 includes a butterfly-shaped throttle valve 21 placed in the intake passage 3, a DC motor 22 to drive the throttle valve 21 to open and close, and a throttle sensor 23 to detect an opening degree or position (a throttle opening degree) TA of the throttle valve 21. This throttle device 14 is configured so that the throttle valve 21 is driven by the DC motor 22 to open and close according to operation of an accelerator pedal 26 by a driver to adjust the opening degree. The configuration of this throttle device 14 can be provided by for example a basic configuration of a "throttle device" disclosed in JP-A-2011-252482, FIGS. 1 and 2. In the exhaust passage 5 downstream from the turbine 9, a catalytic converter 15 is provided as an exhaust catalyst to clean exhaust gas.

The engine 1 is further provided with an injector 25 to inject and supply fuel into a combustion chamber 16. The injector 25 is configured to be supplied with the fuel from a fuel tank (not shown).

In the present embodiment, the EGR apparatus to enable high EGR includes an exhaust gas recirculation (EGR) passage 17 allowing part of exhaust gas discharged from the combustion chamber 16 of the engine 1 to the exhaust passage 5 to flow in the intake passage 3 as EGR gas and recirculate back to the combustion chamber 16, and an exhaust gas recirculation (EGR) valve 18 placed in the EGR passage 17 to regulate an exhaust gas flow rate (EGR flow rate) in the EGR passage 17. The EGR passage 17 is provided to extend between the exhaust passage 5 upstream from the turbine 9 and the surge tank 3a. Specifically, an outlet 17a of the EGR passage 17 is connected to the surge tank 3a on a downstream side from the throttle valve 21 in order to allow a part of exhaust gas flowing in the exhaust passage 5 to flow as EGR gas into the intake passage 3 and recirculate to the combustion chamber 16. An inlet 17b of the EGR passage 17 is connected to the exhaust passage 5 upstream from the turbine 9.

In the vicinity of the inlet 17b of the EGR passage 17, an EGR catalytic converter 19 is provided to clean EGR gas. In the EGR passage 17 downstream from this EGR catalytic converter 19, an EGR cooler 20 is provided to cool EGR gas flowing in the EGR passage 17. In the present embodiment, the EGR valve 18 is located in the EGR passage 17 downstream from the EGR cooler 20.

Figure 2:
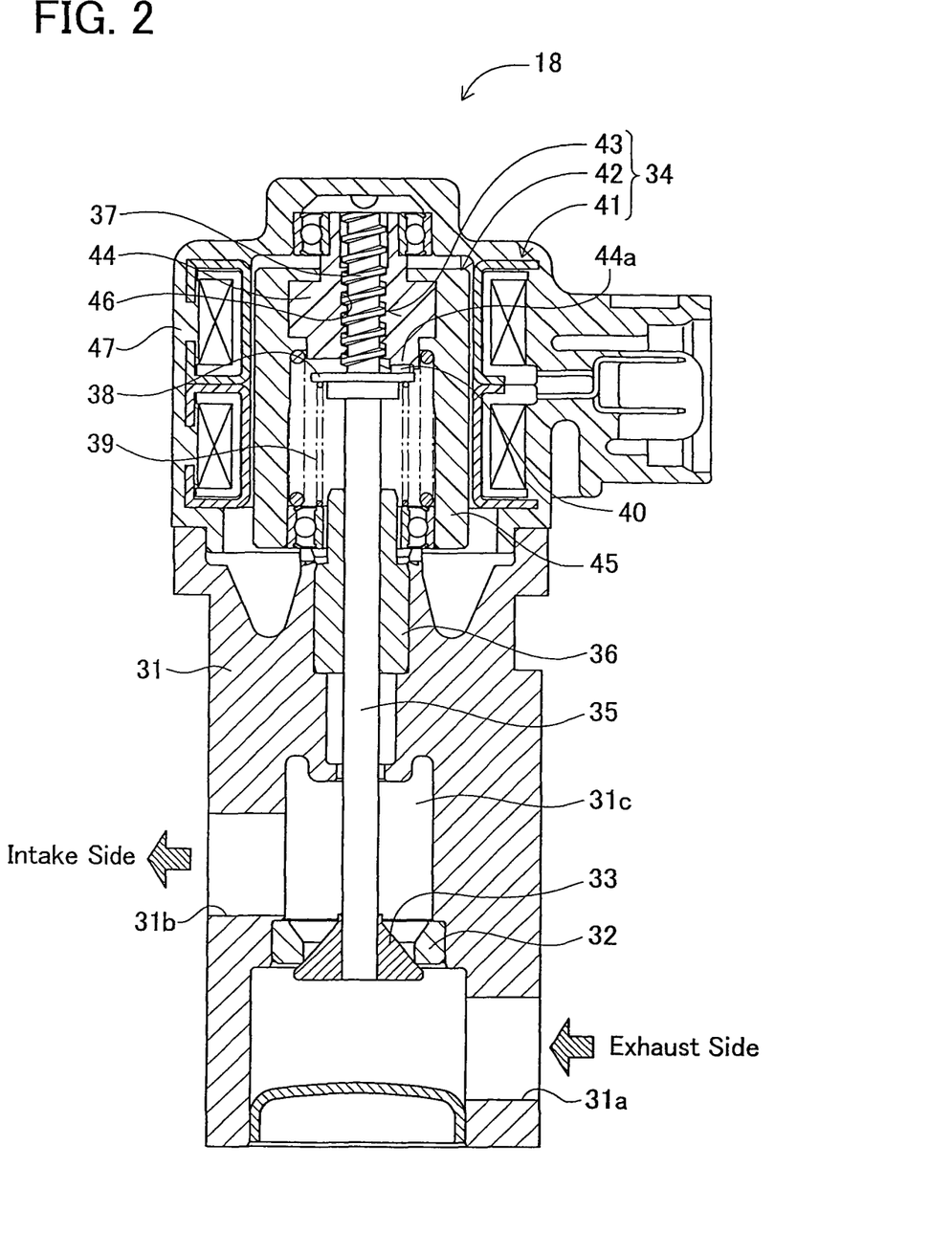
FIG. 2 is a cross sectional view showing a schematic configuration of an EGR valve in the embodiment.
Figure 3:
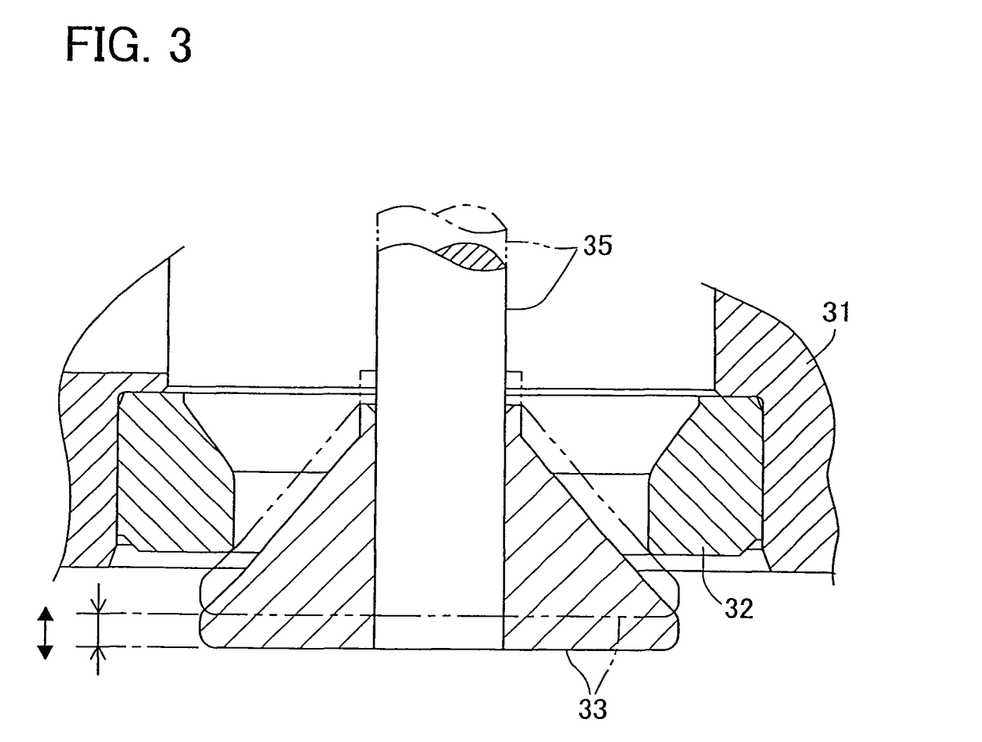
FIG. 3 is an enlarged cross sectional view showing a valve seat and a valve element of the EGR valve in the embodiment.

FIG. 2 is a cross sectional view showing a schematic configuration of the EGR valve 18. FIG. 3 is an enlarged cross sectional view showing a valve seat 32 and a valve element 33 in the EGR valve 18. As shown in FIG. 2, the EGR valve 18 is configured as a poppet valve and a motor-operated valve. Specifically, the EGR valve 18 is provided with a housing 31, a valve seat 32 provided in the housing 31, a valve element 33 configured to seat on and move away from the valve seat 32 inside the housing 31, and a step motor 34 to perform stroke movement of the valve element 33. The housing 31 includes an inlet 31a through which EGR gas flows from the side of the exhaust passage 5 (an exhaust side), an outlet 31b through which exhaust gas flows to the side of the intake passage 3 (an intake side), and a communication passage 31c providing communication between the inlet 31a and the outlet 31b. The valve seat 32 is provided at a midpoint of the communication passage 31c.

The step motor 34 includes an output shaft 35 arranged to reciprocate in a straight line (stroke movement). The valve element 33 is fixed at a leading end of the output shaft 35. This output shaft 35 is supported to be able to perform stroke movement through a bearing 36 provided in the housing 31. The output shaft 35 is formed, in its upper part, with a male screw section 37. The output shaft 35 is further formed, in its middle part (near a lower end of the male screw section 37), with a spring retainer 38.

This spring retainer 38 has a lower surface serving as a rest for holding a compression spring 39 and an upper surface formed with a stopper 40.

The valve element 33 has a conical shape and is configured to come into or out of contact with the valve seat 32. The valve element 33 is urged toward the step motor 34 by the compression spring 39 placed between the spring retainer 38 and the housing 31, that is, in a valve closing direction to seat on the valve seat 32. When the valve element 33 is stroke-moved from a closed state by the output shaft 35 of the step motor 34 against the urging force of the compression spring 39, the valve element 33 is moved away from the valve seat 32 to a valve open state. For valve opening, specifically, the valve element 33 is moved toward the upstream side (exhaust side) of the EGR passage 17. As above, the EGR valve 18 is configured to open by moving the valve element 33 from the closed state in which the valve element 33 seats on the valve seat 32 toward the upstream side of the EGR passage 17 against the exhaust gas pressure or intake pressure of the engine 1. On the other hand, the valve element 33 is stroke-moved from the open state in the urging direction of the compression spring 39 by the output shaft 35 of the step motor 34, so that the valve element 33 comes near the valve seat 32 and into the closed state. For valve closing, specifically, the valve element 33 is moved toward the downstream side (intake side) of the EGR passage 17.

By stroke-moving the output shaft 35 of the step motor 34, the opening degree of the valve element 33 is adjusted with respect to the valve seat 32. This output shaft 35 is arranged to be stroke-movable only in a predetermined stroke range from the fully closed state where the valve element 33 seats on the valve seat 32 to the fully opened state where the valve element 33 is most apart from the valve seat 32. To achieve high EGR, in the present embodiment, the area of a passage opening in the valve seat 32 is set larger than that in the conventional art. Accordingly, the valve element 33 is designed to be larger in size than that in the conventional art.

The step motor 34 includes coils 41, a magnet rotor 42, and a converting mechanism 43. The step motor 34 is configured so that the coils 41 are excited or energized by currents to rotate the magnet rotor 42 by a predetermined number of motor steps. By this rotation, the converting mechanism 43 converts the rotational movement of the magnet rotor 42 into the stroke movement of the output shaft 35, thereby stroke-moving the valve element 33.

The magnet rotor 42 includes a rotor body 44 made of resin and a ring-shaped plastic magnet 45. The rotor body 44 is formed, in its center, with a female screw section 46 threadedly engaging with the male screw section 37 of the output shaft 35. When the rotor body 44 is rotated with its female screw section 46 threadedly engaging with the male screw section 37 of the output shaft 35, the rotational movement of the rotor body 44 is converted to stroke movement of the output shaft 35. Herein, the male screw section 37 and the female screw section 46 constitute the aforementioned converting mechanism 43. The rotor body 44 is formed, at its bottom, with a contact portion 44a against which the stopper 40 of the spring retainer 38 abuts. When the EGR valve 18 is fully closed, the end face of the stopper 40 comes into surface contact with the end face of the contact portion 44a, thereby restricting the initial position of the output shaft 35. The above coils 41, magnet rotor 42, converting mechanism 43, and other components are covered by a resin casing 47.

In the present embodiment, the number of motor steps of the step motor 34 is changed in a stepwise manner to minutely adjust the opening degree of the valve element 33 of the EGR valve 18 in stages in a range between full close and full open.

In the present embodiment, for respectively executing fuel injection control, intake amount control, EGR control, and other controls, according to the operating condition of the engine 1, an electronic control unit (ECU) 50 controls the injector 25, the DC motor 22 of the electronic throttle device 14, and the step motor 34 of the EGR valve 18 according to the operating condition of the engine 1, as shown in FIG. 1. The ECU 50 includes a central processing unit (CPU), various memories that store a predetermined control program and others in advance and that temporarily store calculation results and others of the CPU, and an external input circuit and an external output circuit connected to each of them. The ECU 50 is one example of a control unit of the invention. To the external output circuit, there are connected the injector 25, the DC motor 22, and the step motor 34. To the external input circuit, there are connected the throttle sensor 23 and various sensors 27 and 51-55 which are an operating condition detection unit to detect the operating condition of the engine 1 and transmit various engine signals to the external input circuit. The ECU 50 is also arranged to output a predetermined command signal to the step motor 34 of the EGR valve 18 in order to control the step motor 34.

The various sensors provided in the present embodiment include, as shown in FIG. 1, the accelerator sensor 27, the intake pressure sensor 51, the rotation speed sensor 52, the water temperature sensor 53, the air flow meter 54, and the air-fuel ratio sensor 55 as well as the throttle sensor 23. The accelerator sensor 27 detects an accelerator opening degree ACC which is an operation amount of the accelerator pedal 26. This accelerator pedal 26 corresponds to an operating unit to control the operation of the engine 1. The intake pressure sensor 51 detects intake pressure PM in the surge tank 3a. That is, the intake pressure sensor 51 corresponds to an intake pressure detection unit to detect intake pressure PM in the intake passage 3 (the surge tank 3a) downstream from a position in which EGR gas flows in the intake passage 3 from the EGR passage 17. The rotation speed sensor 52 detects the rotation angle (crank angle) of the crank shaft 1a of the engine 1 and also detects changes of the crank angle as the rotation speed (engine rotation speed) NE of the engine 1. The water temperature sensor 53 detects the cooling water temperature TRW of the engine 1. The air flow meter 54 detects a flow amount Ga of intake air flowing in the intake passage 3 directly downstream of the air cleaner 6. The air-fuel ratio sensor 55 is placed in the exhaust passage 5 directly upstream of the catalytic convertor 15 to detect an air-fuel ratio A/F in the exhaust gas.

In the present embodiment, the ECU 50 is configured to control the EGR valve 18 in the whole operating region of the engine 1 to control EGR according to the operating condition of the engine 1. On the other hand, the ECU 50 is arranged to control the EGR valve 18 to move to full close in order to block a flow of EGR during deceleration of the engine 1 and during a period of deceleration fuel cutoff for which fuel supply to the engine 1 is interrupted. Further, the ECU 50 is configured to cut off energization or power to the step motor 34 when the EGR valve 18 is to be held at a predetermined opening degree (e.g., a low opening degree) during operation of the EGR valve 18.

Herein, if the energization to the step motor 34 is cut off during operation of the EGR valve 18, the step motor 34 stops self-heating having occurred until then, which may cause thermal contraction of the components (e.g., the casing 47 and others) adjacent to the step motor 34 in the EGR valve 18 due to resultant temperature decrease. Thereafter, when energization to the step motor 34 is restarted, the step motor 34 undergoes self-heating again, which may cause thermal expansion of the components due to temperature increase. Under the influence of the thermal contraction and the thermal expansion, the output shaft 35 of the step motor 34 may be moved in its axial direction, thereby displacing the valve element 33 with respect to the valve seat 32 as indicated by a solid line and a two-dashed line in FIG. 3. In the present embodiment, therefore, the ECU 50 is arranged to execute the following EGR control to control the EGR valve 18 at an appropriate opening degree by eliminating the influence of thermal contraction resulting from a temperature decrease even when the EGR valve 18 is held at a predetermined opening degree by energization cutoff during operation of the EGR valve 18 and then is to be opened again in a direction to increase an opening degree by restarting of energization.

Figure 4:
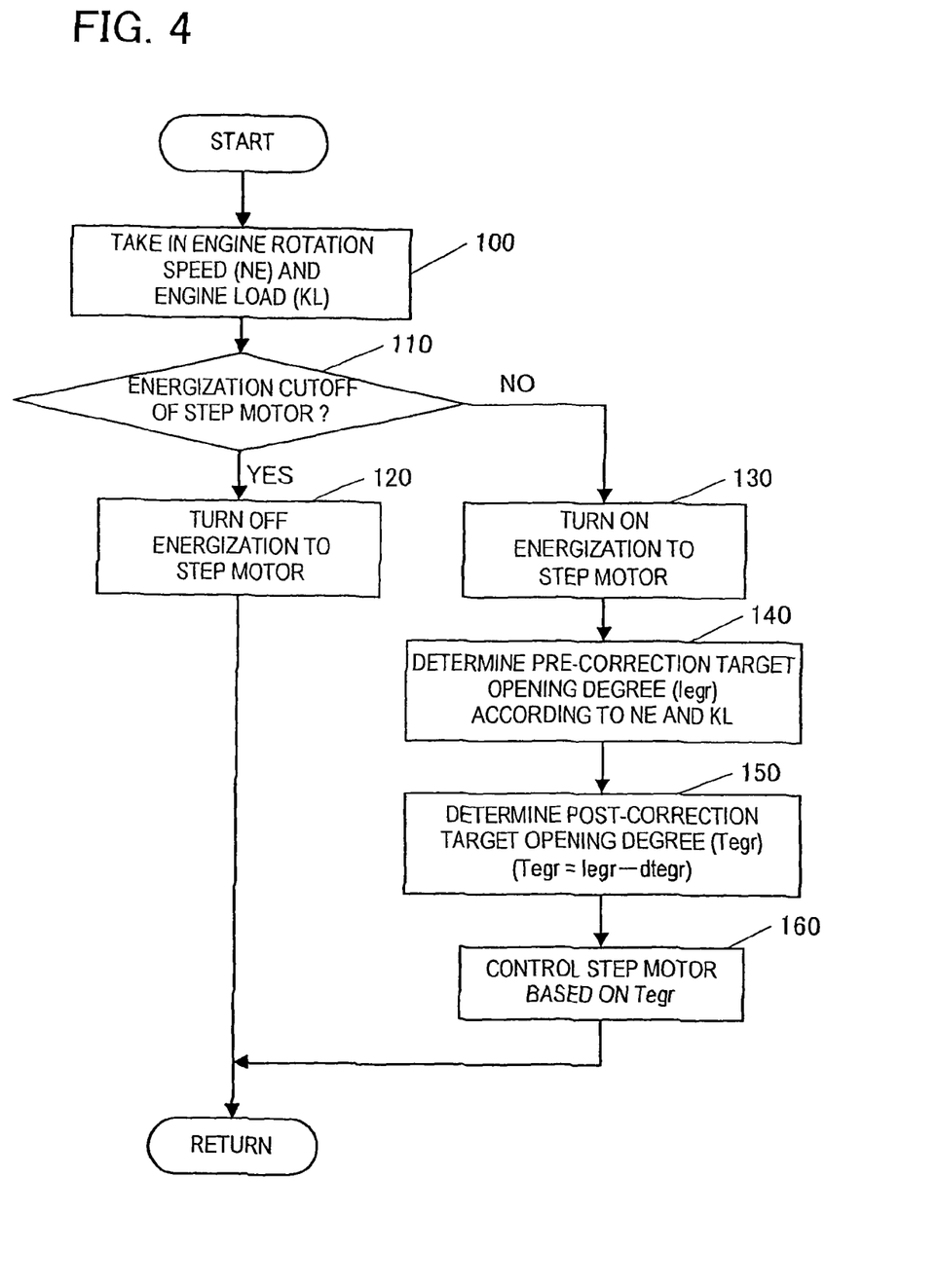
FIG. 4 is a flowchart showing one example of processing details of EGR control in the embodiment.

FIG. 4 is a flowchart showing one example of processing details of the EGR control to be executed by the ECU 50. When the processing shifts to this routine, at step 100, the ECU 50 takes in engine rotation speed NE and engine load KL. Herein, the ECU 50 can determine the engine load KL based on e.g. a relationship between the engine rotation speed NE and intake pressure PM.

At step 110, the ECU 50 determines whether or not energization cutoff of the step motor has to be made. In other words, the ECU 50 determines whether or not the operating condition of the engine 1 corresponds to a condition that energization to the step motor 34 of the EGR valve 18 has to be cut off. For instance, if the operating condition of the engine 1 remains unchanged and the EGR valve 18 is to be held at a predetermined small (low) opening degree, the ECU 50 determines that the energization to the step motor 34 has to be cut off. If this determination result is affirmative, the ECU 50 shifts the processing to step 120. If this determination result is negative, the ECU 50 shifts the processing to step 130.

At step 120, the ECU 50 turns off energization to the step motor 34. Thereafter, the ECU 50 returns the processing to step 100.

At step 130, on the other hand, the ECU 50 turns on energization to the step motor 34.

At step 140, successively, the ECU 50 determines a pre-correction (before correction) target opening degree Iegr of the EGR valve 18 according to the engine rotation speed NE and the engine load KL. The ECU 50 can determine this pre-correction target opening degree Iegr by referring to a predetermined map.

At step 150, the ECU 50 then determines a post-correction (after correction) target opening degree Tegr of the EGR valve 18. Specifically, the ECU 50 calculates this post-correction target opening degree Tegr by subtracting a target opening degree correction value dtegr from the pre-correction target opening degree Iegr. Herein, the ECU 50 takes in the target opening degree correction value dtegr having been calculated separately.

At step 160, the ECU 50 controls the step motor 34 based on the target opening degree Tegr and then returns the processing to step 100.

Figure 5:
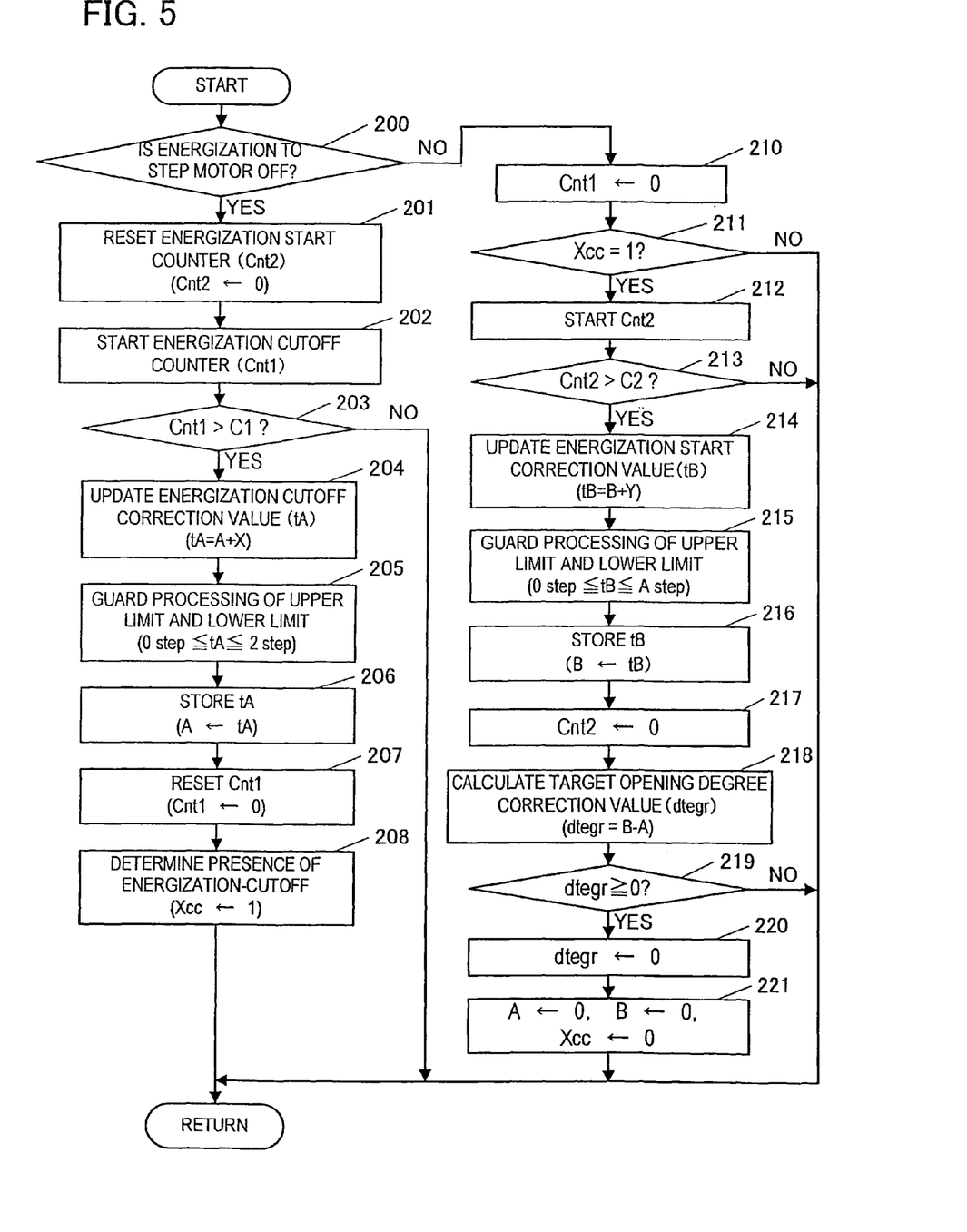
FIG. 5 is a flowchart showing one example of processing details to separately calculate a correction value of a target opening degree in relation to the EGR control in the embodiment.

FIG. 5 is a flowchart showing one example of processing details to separately calculate the target opening degree correction value dtegr in relation to the aforementioned EGR control. When the processing shifts to this routine, at step 200, the ECU 50 determines whether or not the energization to the step motor 34 is off. If this determination result is affirmative, the ECU 50 advances the processing to step 201. If this determination result is negative, the ECU advances the processing to step 210.

At step 201, the ECU 50 resets an energization start counter Cnt2 to "0".

At step 202, the ECU 50 successively starts an energization cutoff counter Cnt1, that is, starts to increment a count.

At step 203, the ECU 50 further determines whether or not the energization cutoff counter Cnt1 is larger than a predetermined value C1. If this determination result is affirmative, the ECU 50 shifts the processing to step 204. If this determination result is negative, the ECU 50 returns the processing to step 200.

At step 204, the ECU 50 updates an energization cutoff correction value tA. That is, the ECU 50 determines this energization cutoff correction value tA by adding a constant X to a previously updated energization cutoff correction value A. Herein, the constant X represents a predetermined correction value per unit of time. In the present embodiment, for example, a value "0.03 (step/100 ms)" can be adopted.

Subsequently, at step 205, the ECU 50 performs guard processing of upper limit and lower limit. That is, the ECU 50 limits the currently updated energization cutoff correction value tA in a range of a lower limit (0 step) or more and an upper limit (2 step) or less.

At step 206, the currently updated energization cutoff correction value tA is stored in a memory. Specifically, the ECU 50 sets the currently updated energization cutoff correction value tA as the previously updated energization cutoff correction value A.

At step 207, the ECU 50 resets the energization cutoff counter Cnt1 to "0".

At step 208, the ECU 50 performs determination of the presence of energization cutoff correction. In other words, the ECU 50 sets a flag Xcc indicating the presence of energization cutoff correction to "1". Then, the ECU 50 returns the processing to step 200.

At step 210, on the other hand, the ECU 50 resets the energization cutoff counter Cnt1 to "0".

At step 211, the ECU 50 then whether or not the flag Xcc indicating the presence of energization cutoff correction is "1", that is, whether or not the energization cutoff correction has been made. If this determination result is affirmative, the ECU 50 shifts the processing to step 212. If this determination result is negative, the ECU 50 returns the processing to step 200.

At step 212, the ECU 50 starts the energization start counter Cnt2, that is, starts to increment a count.

At step 213, the ECU 50 determines whether or not the energization start counter Cnt2 is larger than a predetermined value C2. The ECU 50 then advances the processing to step 214 if this determination is affirmative or returns the processing to step 200 if this determination is negative.

At step 214, the ECU 50 updates an energization start correction value tB. Specifically, the ECU 50 calculates this correction value tB by adding a constant Y to a previously updated energization start correction value B. Herein, the constant Y (X>Y) represents a predetermined correction value per unit of time. In the present embodiment, for example, a value "0.01 (step/100 ms)" can be adopted.

Herein, the aforementioned predetermined values C1 and C2 and constants X and Y can be determined according to the performance of the step motor 34, environmental temperature, and other conditions.

Successively, at step 215, the ECU 50 performs guard processing of upper limit and lower limit. Specifically, the ECU 50 limits the currently updated energization start correction value tB in a range of a lower limit (0 step) or more and an upper limit (A step) or less.

At step 216, the currently updated energization start correction value tB is stored in the memory. Specifically, the ECU 50 sets the currently updated energization start correction value tB as the previously updated energization start correction value B.

At step 217, the ECU 50 then resets the energization start counter Cnt2 to "0".

At step 218, the ECU 50 determines the target opening degree correction value dtegr. Specifically, the ECU 50 calculates the target opening degree correction value dtegr by subtracting the previously updated energization cutoff correction value A from the previously updated energization start correction value B.

At step 219, the ECU 50 determines whether or not the target opening degree correction value dtegr is "0" or more. The ECU 50 advances the processing to step 220 if this determination result is affirmative or returns the processing to step 200 if this determination result is negative.

At step 220, the ECU 50 resets the target opening degree correction value dtegr to "0".

At step 221, the ECU 50 resets each of the previously updated energization cutoff correction value A, the previously updated energization start correction value B, and the flag Xcc indicating the presence of energization cutoff correction to "0". Then, the ECU 50 returns the processing to step 200.

According to the above control, the ECU 50 calculates the pre-correction target opening degree Iegr corresponding to the operating condition of the engine 1 and cuts off energization to the step motor 34 when the EGR valve 18 is to be held at a predetermined small (low) opening degree during operation of the EGR valve 18. When the EGR valve 18 is to be controlled to the post-correction target opening degree Tegr, thereafter, the ECU 50 restarts energization to the step motor 34 and calculates the energization cutoff correction value A corresponding to a value of the energization cutoff counter Cnt1 representing an elapsed time from cutoff of energization to the step motor 34, and corrects the pre-correction target opening degree Iegr by the calculated energization cutoff correction value A (included in the target opening degree correction value dtegr) to thereby calculate the post-correction target opening degree Tegr.

Furthermore, the ECU 50 calculates the energization start correction value B corresponding to a value of the energization start counter Cnt2 representing an elapsed time from restart of energization to the step motor 34, and further corrects the pre-correction target opening degree Iegr by the energization start correction value B (included in the target opening degree correction value dtegr) to thereby calculate the post-correction target opening degree Tegr.

In addition, the ECU 50 limits calculation of the energization cutoff correction value A in a range of a predetermined upper limit to a predetermined lower limit. Similarly, the ECU 50 limits calculation of the energization start correction value B in a range of a predetermined upper limit to a predetermined lower limit.

Figure 6:
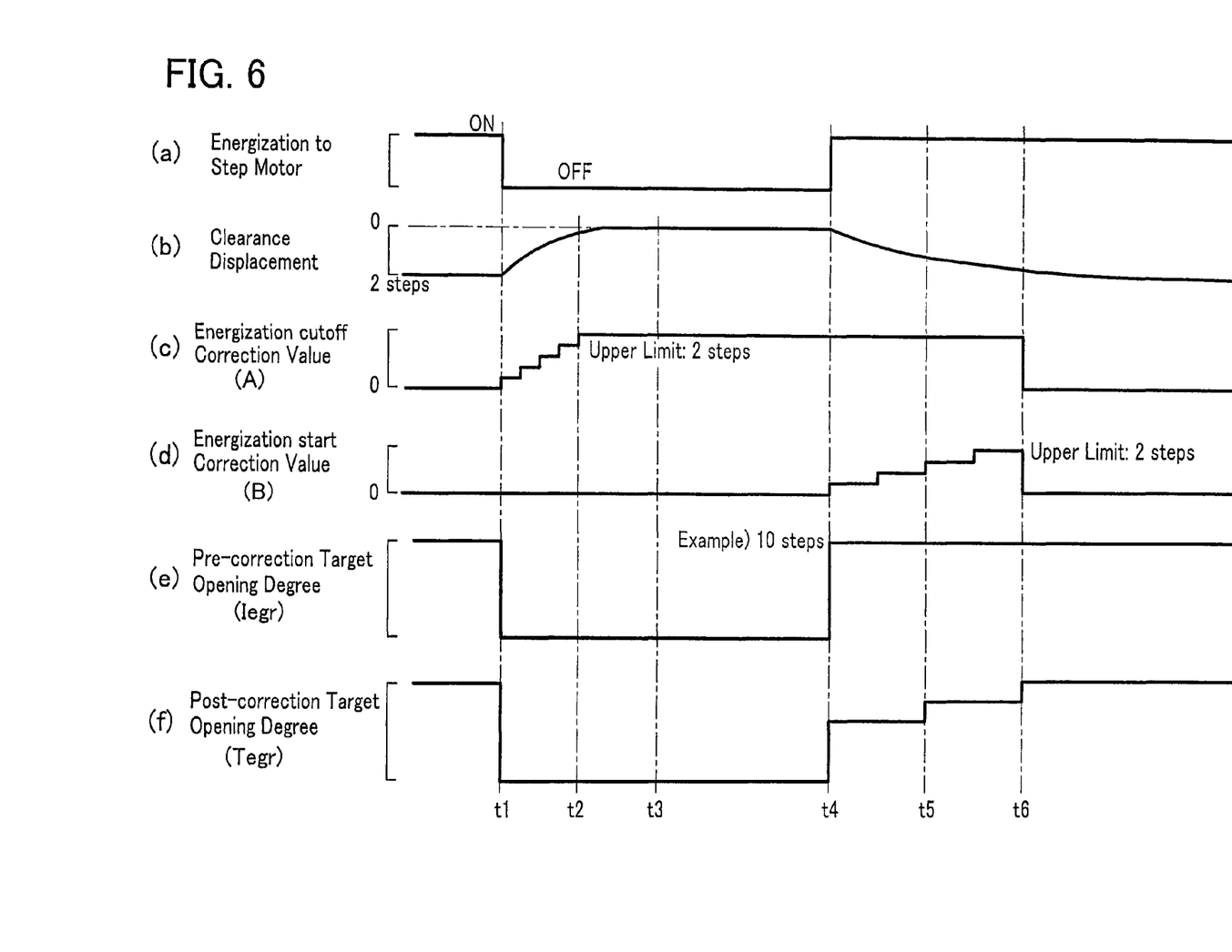
FIG. 6 is a time chart showing behaviors of various parameters related to EGR control and others in the embodiment.

Herein, FIG. 6 is a time chart showing behaviors of various parameters related to the above control. In FIG. 6, when energization to the step motor 34 is cut off at time t1 as shown in FIG. 6(a), the step motor 34 having hitherto been a heating source resulting from energization is stopped. Thereafter, as time advances to time t3, the casing 47 and others which are resin components of the EGR valve 18 undergo thermal contraction due to temperature decrease. Thus, the valve element 33 is displaced with respect to the valve seat 32, thereby changing clearance displacement between the valve element 33 and the valve seat 32 as shown in FIG. 6(b). Herein, the opening degree is liable to increase with time from a small opening degree having been held by energization cutoff (increase by an amount corresponding to a clearance of "2 steps" in terms of the number of motor steps).

At time t1, as shown in FIGS. 6(e) and (f), the pre-correction target opening degree Iegr and the post-correction target opening degree Tegr are respectively decreased to small opening degrees and then those small opening degrees are held constant for a period until time t4 is reached. At time t1, furthermore, as shown in FIG. 6(c), calculation of the energization cutoff correction value A is started and incremented in stepwise manner up to the upper limit (2 steps) for a period until time t2 is reached.

Thereafter, at time 4, when energization to the step motor 34 is restarted as shown in FIG. 6(a), the clearance displacement starts to change as indicated in FIG. 6(b) and returns to an initial state until time 6. At time t4, as shown in FIG. 6(e), the pre-correction target opening degree Iegr increases from the small opening degree to a predetermined opening degree. Furthermore, at time t4, as shown in FIG. 6(d), the energization start correction value B starts to be calculated and incremented in stepwise manner up to the upper limit (2 steps) for a period until time t6 is reached. Accordingly, as shown in FIG. 6(f), from time t4 to time t6, the post-correction target opening degree Tegr is corrected to increase step by step. In this way, the post-correction target opening degree Tegr is corrected to stepwise increase in response to the clearance displacement, that is, changes in error of the opening degree of the EGR valve 18. Thus, the error of opening degree of the EGR valve 18 is eliminated.

In the configuration of the exhaust gas recirculation apparatus for an engine in the present embodiment explained as above, when the energization to the step motor 34 of the EGR valve 18 is cut off, the step motor 34 no longer undergoes self-heating that has occurred until then. This may cause thermal contraction of the casing 47 and others which are components adjacent to the step motor 34 due to temperature decrease and thus displace the valve element 33 with respect to the valve seat 32. Accordingly, an actual opening degree of the EGR valve 18 may be deviated from an intended target correction value.

In contrast, according to the configuration of the present embodiment, the pre-correction target opening degree Iegr corresponding to the operating condition of the engine 1 is calculated by the ECU 50. When the EGR valve 18 is to be held at a predetermined opening degree during operation of the EGR valve 18, the ECU 50 cuts off energization to the step motor 34. When the EGR valve 18 is thereafter to be controlled to the post-correction target opening degree Tegr suitable for the operating condition of the engine 1, the ECU 50 restarts energization to the step motor 34 and also calculates the energization cutoff correction value A corresponding to a value of the energization cutoff counter Cnt1 representing an elapsed time since energization to the step motor 34 is cutoff. By the target opening degree correction value dtegr including the energization cutoff correction value A, the ECU 50 corrects the pre-correction target opening degree Iegr, thereby calculating the post-correction target opening degree Tegr. Accordingly, a deviation of the actual opening degree from the post-correction target opening degree Tegr after cutoff of energization to the step motor 34 is reduced by the energization cutoff correction value A. Therefore, even if the motor-driven EGR valve 18 is held at a predetermined opening degree by energization cutoff during operation thereof and then is opened again in a direction to increase an opening degree by restart of the energization, it is possible to control the EGR valve 18 at an appropriate opening degree in response to the deviation of the actual opening degree caused by thermal contraction. This can provide appropriate control of a flow rate of EGR gas allowed to recirculate to the combustion chamber 16 and prevent degradation in exhaust emission and driveability of the engine 1. In the present embodiment, the energization to the step motor 34 is cut off when the opening degree of the EGR valve 18 is to be held at a predetermined opening degree. This enables reducing power consumption of the step motor 34 and improving fuel consumption of the engine 1.

In the configuration of the present embodiment, when the energization to the step motor 34 is restarted, the step motor 34 may undergo self-heating again. This may cause thermal expansion of the casing 47 and others adjacent to the step motor 34 due to temperature increase and thus displace the valve element 33 with respect to the valve seat 32. Accordingly, the actual opening degree of the EGR valve 18 may be deviated from the post-correction target opening degree Tegr.

In contrast, according to the configuration of the present embodiment, the ECU 50 calculates the energization start correction value B (included in the target opening degree correction value dtegr) corresponding to a value of the energization start counter Cnt2 representing an elapsed time since energization to the step motor 34 is restarted. By the energization start correction value B, the ECU 50 further corrects the pre-correction target opening degree Iegr, thereby calculating the post-correction target opening degree Tegr. Accordingly, the deviation of the actual opening degree from the pre-correction target opening degree Iegr after restart of the energization to the step motor 34 is reduced by the energization start correction value B. Therefore, even if energization is restarted from energization cutoff to open the motor-driven EGR valve 18 again in a direction to increase an opening degree, it is possible to control the EGR valve 18 at a more appropriate opening degree in response to the deviation of the actual opening degree caused by thermal expansion. This can provide more appropriate control of a flow rate of EGR gas allowed to recirculate to the combustion chamber 16 and prevent degradation in exhaust emission and driveability of the engine 1.

In the present embodiment, the energization cutoff correction value A is limited in a range of the predetermined upper limit to the predetermined lower limit, so that the energization cutoff correction value A is neither too large nor too small. This can define an effective magnitude of the energization cutoff correction value A (the target opening degree correction value dtegr) and thus effectively correct the pre-correction target opening degree Iegr to obtain an appropriate post-correction target opening degree Tegr.

In the present embodiment, the energization start correction value B is limited in a range of the predetermined upper limit to the predetermined lower limit, so that the energization start correction value B is neither too large nor too small. This can define an effective magnitude of the energization start correction value B (the target opening degree correction value dtegr) and thus more effectively correct the pre-correction target opening degree Iegr to obtain a more appropriate post-correction target opening degree Tegr.

Figure 7:
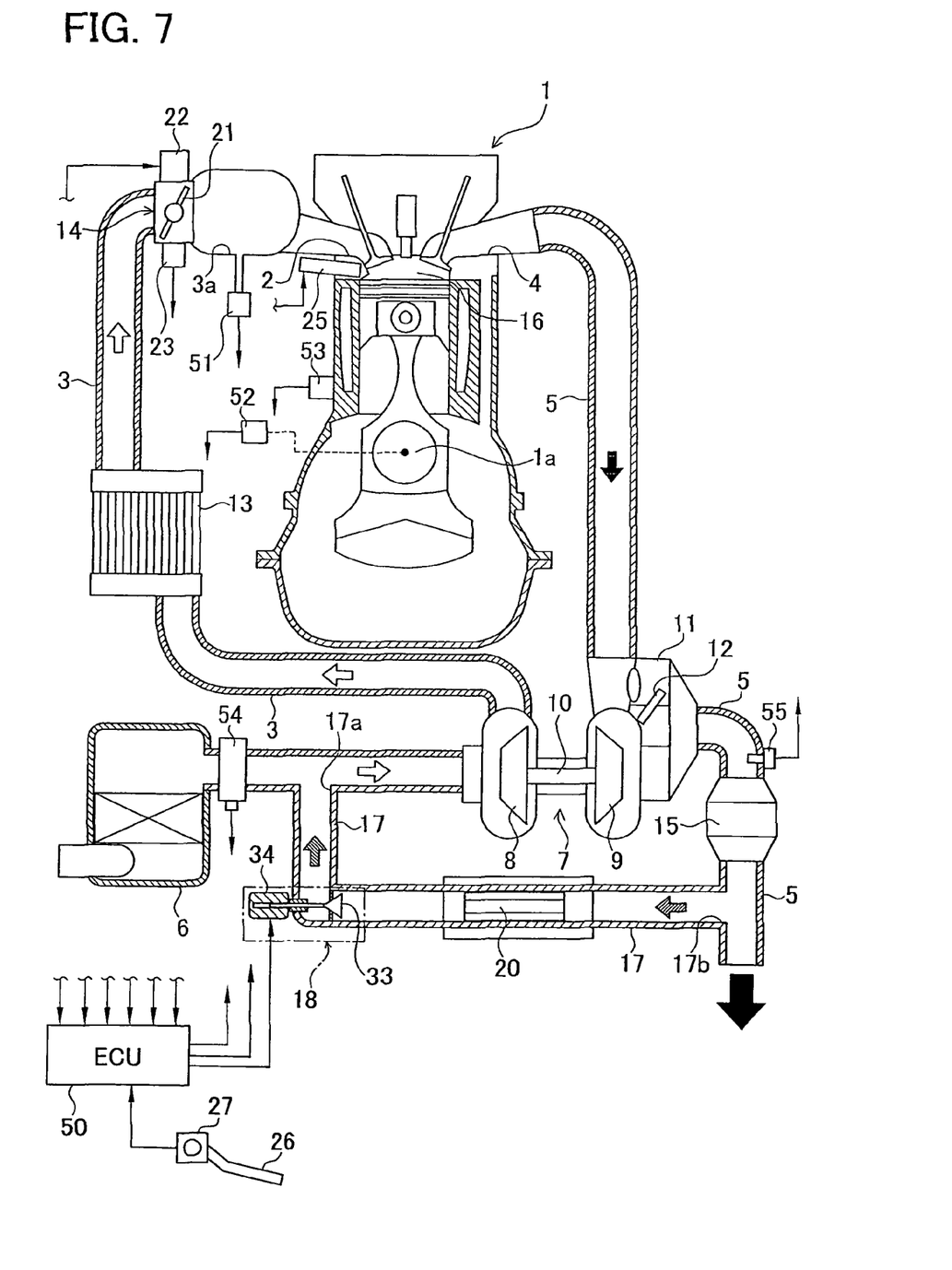
FIG. 7 is a schematic configuration view showing a supercharger-equipped engine system including an EGR apparatus for an engine in another embodiment.

The present invention is not limited to the above embodiments and may be embodied variously in other specific forms without departing from the essential characteristics thereof (1) In the above embodiment, as shown in FIG. 1, the outlet 17a of the EGR passage 17 is connected to the surge tank 3a downstream of the throttle valve 21 and the inlet 17b is connected to the exhaust passage 5 upstream of the turbine 9. An alternative may be configured as shown in FIG. 7 such that the inlet 17b of the EGR passage 17 is connected to the exhaust passage 5 downstream of the catalytic convertor 15 and the outlet 17a is connected to the intake passage 3 upstream of the compressor 8. FIG. 7 is a schematic configuration view of a supercharger-equipped engine system including the exhaust gas recirculation (EGR) apparatus for an engine.

(2) The above embodiment embodies the EGR apparatus of the invention as the engine 1 equipped with the supercharger 7. The EGR apparatus of the invention can be embodied as an engine not provided with a supercharger.

(3) In the above embodiment, the step motor 34 is used as an actuator of the EGR valve 18. Besides the step motor, a DC motor may also be used.

INDUSTRIAL APPLICABILITY

The present invention is applicable to a gasoline engine or a diesel engine for vehicles.

| Reference Signs List | | | |
|---|---|---|---|
| 1 | Engine | 3 | Intake passage |
| 3a | Surge tank | 5 | Exhaust passage |
| 17 | EGR passage (Exhaust gas recirculation passage) | | |
| 18 | EGR valve (Exhaust gas recirculation valve) | | |
| 32 | Valve seat | 33 | Valve element |
| 34 | Step motor | 50 | ECU (Control unit) |
| Iegr | Pre-correction target opening degree | Tegr | Post-correction target opening degree |
| dtegr | Target opening correction value | | |
| Cnt1 | Energization cutoff counter | Cnt2 | Energization start counter |
| A | Energization cutoff correction value | B | Energization start correction value |

The invention claimed is:

1. An exhaust gas recirculation apparatus for an engine, the apparatus including:
an exhaust gas recirculation passage to allow part of exhaust gas discharged from a combustion chamber of an engine to an exhaust passage to flow as exhaust recirculation gas into an intake passage and recirculate back to the combustion chamber;
a motor-driven exhaust gas recirculation valve provided in the exhaust gas recirculation passage to regulate a flow rate of the exhaust recirculation gas in the exhaust gas recirculation passage,
the exhaust gas recirculation valve including a valve seat, a valve element provided to be seatable on the valve seat, a motor to drive the valve element, and a constituent component related to the valve seat, the valve element, and the motor; and
a control unit configured to control the exhaust gas recirculation valve according to an operating condition of the engine,
wherein the control unit is configured to:
calculate a target correction value corresponding to the operating condition of the engine;
cut off energization to the motor when the exhaust gas recirculation valve is to be held at a fully closing degree during operation of the exhaust gas recirculation valve; and then
restart energization to the motor, calculate an energization cutoff correction value corresponding to an elapsed time since energization to the motor is cut off in order to correct displacement of the valve element with respect to the valve seat in association with thermal contraction of the constituent component caused by reduction in temperature, and correct the target correction value by the calculated energization cutoff correction value when the exhaust gas recirculation valve is to be controlled to a target opening degree.

2. The exhaust gas recirculation apparatus for an engine according to claim 1, wherein
the control unit is configured to further calculate an energization start correction value corresponding to an elapsed time since energization to the motor is restarted and further correct the target correction value by the calculated energization start correction value.

3. The exhaust gas recirculation apparatus for an engine according to claim 1, wherein
the control unit is configured to limit calculation of the energization cutoff correction value in a range of a predetermined upper limit to a predetermined lower limit.

4. The exhaust gas recirculation apparatus for an engine according to claim 2, wherein
the control unit is configured to limit calculation of the energization cutoff correction value in a range of a predetermined upper limit to a predetermined lower limit.

5. The exhaust gas recirculation apparatus for an engine according to claim 2, wherein
the control unit is configured to limit calculation of the energization start correction value in a range of a predetermined upper limit to a predetermined lower limit.

6. The exhaust gas recirculation apparatus for an engine according to claim 4, wherein
the control unit is configured to limit calculation of the energization start correction value in a range of a predetermined upper limit to a predetermined lower limit.

* * * * *